Oct. 21, 1969　　K. E. HUMBERT, JR　　3,473,666
THROWAWAY FILTER CONSTRUCTION
Filed Feb. 9, 1967　　2 Sheets-Sheet 2
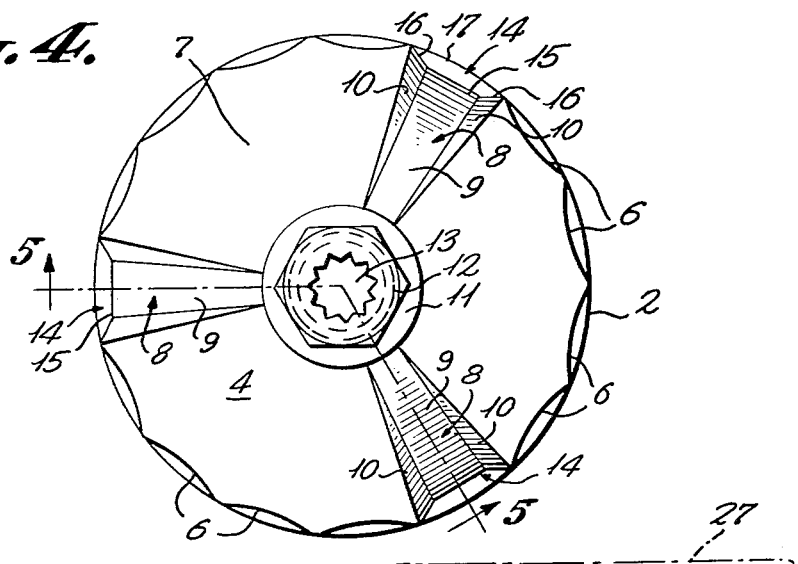
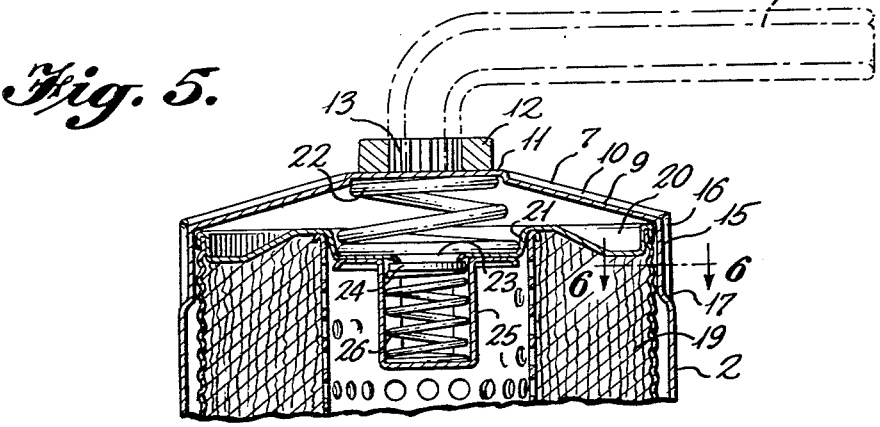
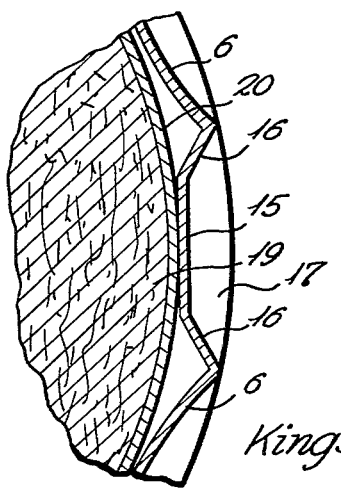
INVENTOR
Kingsley E. Humbert, Jr.
BY Shoemaker and Mattare
ATTORNEYS United States Patent Office 3,473,666
Patented Oct. 21, 1969

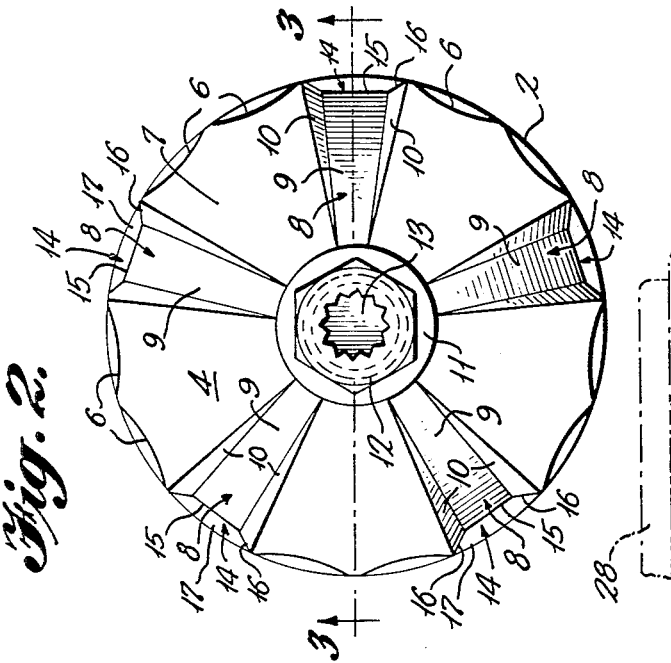
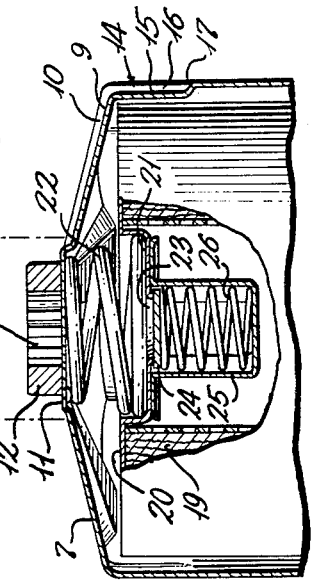
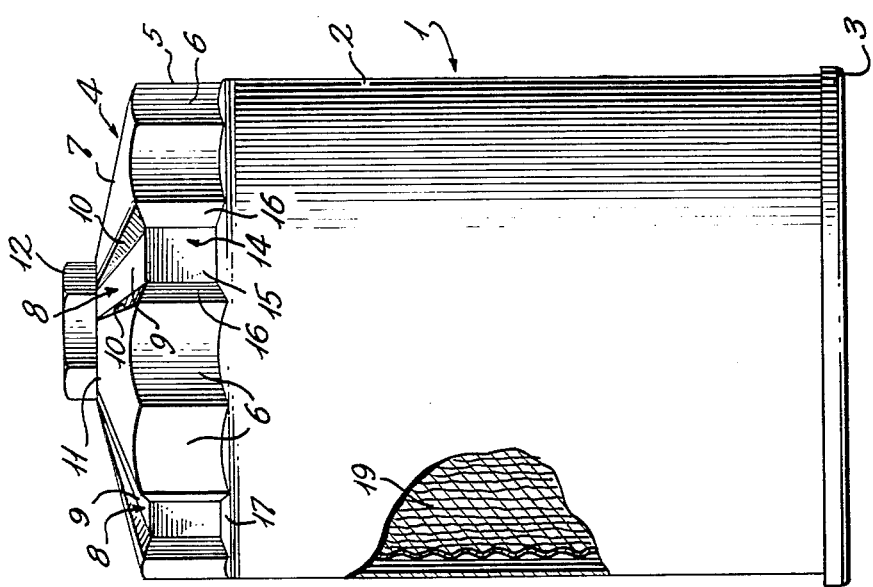

3,473,666
THROWAWAY FILTER CONSTRUCTION
Kingsley E. Humbert, Jr., Gastonia, N.C., assignor to Wix Corporation, Gastonia, N.C., a corporation of North Carolina
Filed Feb. 9, 1967, Ser. No. 614,957
Int. Cl. B01d 27/08, 27/04, 27/00
U.S. Cl. 210—232                                   1 Claim

ABSTRACT OF THE DISCLOSURE

This invention is upon a throwaway filter construction in which the outer container is provided at one end with reinforcing ribs or grooves and is so formed as to allow the use of any type of wrench in tightening or loosening the filter to or from its connection. The ribs or grooves also serving to maintain the filter element in correct placement within the container to allow flow thereabout.

BACKGROUND OF THE INVENTION

This invention relates to a throwaway filter wherein one end of the container therefor is provided with means whereby any type of wrench may be applied thereto and with a reinforcing means to prevent collapse or rupture of the container when applying or removing it to or from its connection.

Heretofore the container does not have any means for application of a wrench nor any reinforcing means. Any container having a means for application of a wrench does not provide means upon which any known type of wrench may be used nor does the container have any reinforcing means whatsoever to prevent collapse of the container upon application of pressure to apply or remove the container to or from its mounting.

SUMMARY OF THE INVENTION

An object of the invention is to provide the container of a throwaway filter construction with reinforcing ribs or grooves at one end with the ribs or grooves extending radially outwardly from the center of the top of the container, the ribs or grooves being equi-spaced around the end of the top of the container and downwardly along the upper portion of the wall of the container. Means are provided at the upper portion of the wall and to the center of the top whereby practically any known type of wrench may be used to apply or remove the container from its mounting. The inner portion of the ribs serve to center the filter media within the container and also prevent the filter media from moving upwardly within the container to close off the upper portion of the filter media from flow of the fluid being filteerd from around the end of the filter media and to further allow flow of fluid to the bypass valve upon cold start-up or when the filter media becomes clogged with filtrate and there is a build-up of pressure in the fluid being filtered.

Other objetcs and features of the invention will become apparent from the following specification and the accompanying drawings, wherein:

FIG. 1 is an elevational view of the throwaway filter with a part broken away;

FIG. 2 is a top plan view of the top of the filter unit;

FIG. 3 is a cross-sectional view taken on line 3—3 of FIG. 2;

FIG. 4 is a top plan view of the top of the filter unit slightly modified;

FIG. 5 is a cross-sectional view taken on line 5—5 of FIG. 4; and

FIG. 6 is a sectional view taken on line 6—6 of FIG. 5.

DESCRIPTION OF THE PREFERRED EMBODIMENTS

The throwaway filter generally designated as 1 is provided with an outer wall 2. One end of the outer wall has connected to it by a roll seam or any other form of connection an end plate 3 which also carries the means by which the filter may be mounted or connected to its point of use on an internal combustion engine or any structures upon which the filter is used. The free end of the filter container 4 is connected to the outer wall 2 at the upper portion 5 thereof by a plurality of flutes 6 in the upper portion. The free end of the filter unit comprises a closed end or top wall 7 having a plurality of grooves or ribs generally designated at 8 equi-spaced around the top wall and radiating outwardly from the center thereof. The grooves comprise a bottom wall 9 which is substantially flat, but follows generally the outwardly and downwardly extending incline of the top wall 7, but spaced below the surface thereof. Connecting the bottom wall 9 of the groove to the top wall 7 are side walls 10, which side walls extend outwardly and downwardly from the center portion of the top wall 7 to the top portion 5 of the outer wall and are substantially triangular in shape. The grooves or ribs together with the side walls provide a reinforcement of the top and upper portion of the outer wall when torque is applied to the free end of the filter construction.

The top wall 7 is provided with a substantially flat central portion 11 which is substantially round in shape and to which is applied a nut 12 by welding or other affixing means. The nut 12 is provided with straight side walls and a center 13 of a specific configuration, the purpose of which will be described later. The groove or rib 8 extends downwardly as indicated generally at 14 in the upper portion 5 of the outer wall, and is provided with a back wall 15 and side walls 16. The side walls 16 are substantially trapezoid in shape and together with the back wall 15 are equally spaced around the periphery of the upper portion 5 of the outer wall 2 and between a series of flutes 6. The lower end of the back wall 15 extends outwardly forming a shoulder 17 where it joins with the outer wall 2. The grooves or ribs provided on the upper portion 5 of the outer wall 2 and between the series of flutes 6 provide a reinforcement for the upper portion of the side wall when that portion is engaged by various types of wrenches such as a cap, a strap or chain, or in fact, any type of wrench that will engage the flutes to prevent collapse of the upper portion of the outer wall 2 when torque is applied thereto by the wrench.

The throwaway filter contains a filter media 19 which may be any well known type of filtering media and provided at the upper end with an end cap 20. The center portion of the end cap 20 is provided with a well 21, which well has a spring 22 seated therein, with the other end of the spring engaging the inner surface of the flat central portion 11 of the top wall 7. The coil spring maintains the filtering media away from the top wall 7 of the outer container. The well 21 is provided with a central opening 23, which is closed by a valve 24 mounted in the housing 25 and having a coil spring 26 therein bearing against the valve 24 to maintain the valve normally closed.

The central portion 13 of the nut 12 is adapted to be engaged by an Allen wrench such as shown at 27 or any other similar type of wrenches, while the nut 12 can be engaged by a socket wrench such as shown at 28 or any other wrenches such as a box wrench, an open end wrench, or even a monkey wrench; and in fact, any type of wrench which will fit or engage a nut of this type.

The grooves 8 and 14 extend inwardly into the inside of the housing or container, and thus become ribs. The bottom 9 of the groove 8 at its juncture with the side groove or rib 14 is positioned slightly above the end cap 20 of the filtering media. If a sudden surge of pressure should occur within the lower end of the filter housing, the filtering media therein might have a tendency to rise or be moved upwardly in the container against the pressure of the spring 22. When the end cap 20 engages the adjacent portion of the groove or rib 9, it is prevented from going any further, thereby still providing space for flow of the fluid around the upper portion of the filter media into the space above the end cap. Also the back wall 15 of the side groove or rib 14 engages the upper portion of the filter media adjacent the end cap 20 at spaced points about the periphery thereof, and serve to center that portion within the filter housing so that flow of the fluid about the end of the filter media into the space provided between the end cap 20 and the top wall 7 can be filled with the fluid being filtered.

The valve 24 becomes operable upon a build-up of pressure within the container on a cold start-up or upon the filter media becoming clogged with filtrate. The valve 24 will open against the pressure of the spring 26, thus by-passing the fluid around the filtering media and back to its point of use so that the parts having the fluid applied thereto may continue working. In this particular instance, the oil of the lubricating system will by-pass the filtering element and be carried to the bearings and other points to be lubricated within the engine so as to prevent starvation of those points of the lubricating oil.

While there has been shown in FIGURE 2 an arrangement whereby five grooves or ribs are provided in the top wall 7, which grooves are equally spaced within the top wall, it can be readily appreciated that the number of the grooves can be changed to provide the necessary reinforcement of the top portion of the container all in accordance with the particular gauge of the metal used. For instance, in FIGURE 4, there has been shown three such grooves being equally spaced about the top wall 7.

Thus, it will be seen that the top wall 7 of the filter is provided with a plurality of equally spaced grooves extending outwardly radially and downwardly from the flat central portion 11, gradually becoming deeper to the point where the grooves merge with the upstanding grooves provided in the upper portion of the outer wall 2. By this gradual inclination, the side walls 10 of the groove 9 are formed into a substantially triangular shape, while the side walls 16 of the side grooves 14 are substantially of trapezoid shape. The grooves act as a reinforcement means for the top or free end of the filter unit, and are likewise provided with means whereby most any type of wrench that is at presently known can be used to apply or remove the throwaway filter unit from its point of connection to the internal combustion engine or other structure upon which the filter is being used. The grooves provide a reinforcement against collapse of the end wall or upper portion of the side wall when excessive torque is applied by the wrench that is being used to either apply or remove the filter unit from its point of connection.

Also, the grooves or ribs serve a further function of centering the filtering media within the casing and also prevent the filter media from being pushed upwardly in the casing to prevent closing off the space between the filter media and the end wall, thus allowing the fluid to flow entirely around the filtering media and to provide access to the by-pass valve upon a build-up of pressure within the filter unit.

While there has been shown and described a specific embodiment of the invention, it is to be understood that this is by way of illustration only.

I claim:

1. A throwaway filter construction comprising an outer container having an outer wall, a closed wall at one end and a closure wall at the other end, the closure wall carrying mounting means thereon, a filter media within the container, a resilient means within the container adjacent the closed end wall and engaging the filter media, a plurality of reinforcing means formed in the closed end wall and in the outer wall adjacent the one end thereof, the reinforcing means being equi-spaced, the reinforcing means comprising a plurality of grooves extending radially outwardly from a point adjacent the center of the closed wall and into the outer wall, each groove comprising a bottom wall and the side walls, the bottom wall of the groove in the closed end wall gradually tapering outwardly from the center to the end of the closed end wall and merging into the bottom wall of the groove in the one end of the outer wall, the bottom wall of the groove in the outer wall being of substantially the same width as the merging end of the bottom wall of the groove of the closed end wall, the side walls of each groove of the closed end wall being of triangular shape with the apex being adjacent the center of the closed end wall and the base being at the point of mergence with the one end of the outer wall, the side walls of the grooves in the one end of the outer wall being of substantially trapezoidal shape, the bottom walls of the grooves in the closed end wall inclining gradually downwardly from the center of the closed end wall to the point of mergence with the one end of the outer wall and providing spaced high points at the point of mergence inwardly of the closed end wall, the bottom walls of the grooves in the one end of the outer wall extending inwardly from the outer wall, the spaced high points of the bottom walls of the grooves of the closed end wall being engageable by the filter media when moved upwardly against the resilient means due to an increase of pressure within the container thus maintaining the filter media from the closed end wall and allowing flow of fluid between the filter media and the closed end wall, and the grooves in the one end of the outer wall engaging an end portion of the filter media and centering the filter media within the container and allowing flow of fluid around the filter media, a plurality of flutes formed in the one end of the outer wall, the flutes being of substantially the same width as the grooves in the one end of the outer wall, groups of flutes being between the spaced grooves, the flutes and grooves being equi-spaced about the one end of the outer wall, wrench engaging means associated with the closed end wall and with the one end of the outer wall comprising a nut mounted on the closed end wall having a plurality of different type of wrench engaging surfaces and the flutes and grooves providing a plurality of different type of wrench engaging surfaces, the reinforcing means strengthening the closed end wall and the one end of the outer wall against the torque of the types of wrenches used in applying and removing the filter to and from a mounting therefor.

References Cited

UNITED STATES PATENTS

| | | | |
|---|---|---|---|
| 2,748,949 | 6/1956 | James | 210—440 X |
| 2,877,902 | 3/1959 | Chase et al. | 210—440 |
| 3,023,906 | 3/1962 | Moore | 210—444 X |
| 3,085,688 | 4/1963 | Eberle | 210—232 |
| 3,193,101 | 7/1965 | Humbert | 210—130 |
| 3,197,029 | 7/1965 | Yelinek et al. | 210—91 |
| 3,224,585 | 12/1965 | Scavuzzo et al. | 210—232 |
| 3,268,077 | 8/1966 | Ball | 210—131 |
| 3,279,609 | 10/1966 | Francois | 210—232 |

FOREIGN PATENTS 1,189,520  3/1965  Germany.

REUBEN FRIEDMAN, Primary Examiner

W. S. BRADBURY, Assistant Examiner

U.S. Cl. X.R.

210—443